US009529700B2

(12) United States Patent
Raghavan et al.

(10) Patent No.: US 9,529,700 B2
(45) Date of Patent: Dec. 27, 2016

(54) METHOD OF OPTIMIZING EXECUTION OF TEST CASES AND A SYSTEM THEREOF

(71) Applicant: Wipro Limited, Bangalore (IN)

(72) Inventors: Girish Raghavan, Chennai (IN); Ganesh Narayan, Bangalore (IN); Thamilchelvi Peterbarnabas, Chennai (IN)

(73) Assignee: Wipro Limited, Bangalore (IN)

(*) Notice: Subject to any disclaimer, the term of this patent is extended or adjusted under 35 U.S.C. 154(b) by 259 days.

(21) Appl. No.: 14/300,509

(22) Filed: Jun. 10, 2014

(65) Prior Publication Data

US 2015/0309918 A1  Oct. 29, 2015

(30) Foreign Application Priority Data

Apr. 25, 2014  (IN) .......................... 2098/CHE/2014

(51) Int. Cl.
*G06F 9/44* (2006.01)
*G06F 11/36* (2006.01)

(52) U.S. Cl.
CPC ................. *G06F 11/3688* (2013.01)

(58) Field of Classification Search
CPC .................................................. G06F 11/3684
USPC ............................................................ 717/124
See application file for complete search history.

(56) References Cited

U.S. PATENT DOCUMENTS

| 6,668,340 | B1* | 12/2003 | Baker | G06F 11/3688 |
| | | | | 714/26 |
| 7,506,312 | B1* | 3/2009 | Girolami-Rose | G06F 8/71 |
| | | | | 717/101 |
| 7,747,987 | B1* | 6/2010 | Akarte | G06F 11/3688 |
| | | | | 702/179 |
| 7,840,844 | B2* | 11/2010 | Garland | G06F 11/263 |
| | | | | 714/33 |
| 8,196,106 | B2* | 6/2012 | Chow | G01R 31/318364 |
| | | | | 714/25 |
| 8,495,583 | B2* | 7/2013 | Bassin | G06F 11/008 |
| | | | | 717/124 |
| 8,539,282 | B1* | 9/2013 | Kabanov | G06F 11/3688 |
| | | | | 702/182 |
| 8,689,187 | B2* | 4/2014 | Esposito | G06F 11/3672 |
| | | | | 717/124 |

(Continued)

*Primary Examiner* — Lewis A Bullock, Jr.
*Assistant Examiner* — Theodore Hebert
(74) *Attorney, Agent, or Firm* — LeClairRyan, a Professional Corporation

(57) ABSTRACT

The present subject matter relates to a computer implemented method and a computer system for optimizing execution of test cases. The method comprises calculating failure probability level of plurality of test cases based on plurality of test results associated to each of the plurality of test cases and determining dynamic risk profile level based on weights assigned to the failure probability level and risk impact parameter of the plurality of test cases. The method further comprises determining one or more set of optimal test cases to be executed based on the dynamic risk profile level of the plurality of test cases satisfying one or more test rule parameters. Upon determining, the method comprises identifying sequence of executing the one or more set of optimal test cases based on the one or more test sequence parameters and executing the one or more set of optimal test cases in the identified sequence.

14 Claims, 10 Drawing Sheets

(56) References Cited

U.S. PATENT DOCUMENTS

| | | | | |
|---|---|---|---|---|
| 8,930,766 B2* | 1/2015 | Griesinger | .......... | G06F 11/3676 |
| | | | | 714/33 |
| 8,954,930 B2* | 2/2015 | Kamenz | ................ | G06F 11/368 |
| | | | | 714/38.1 |
| 8,997,052 B2* | 3/2015 | Bhagavatula | ....... | G06F 11/3684 |
| | | | | 717/124 |
| 2005/0246207 A1* | 11/2005 | Noonan | ............. | G06F 11/3409 |
| | | | | 705/4 |
| 2008/0256392 A1* | 10/2008 | Garland | ................ | G06F 11/263 |
| | | | | 714/33 |
| 2009/0249123 A1* | 10/2009 | Chow | ................. | G06F 17/5022 |
| | | | | 714/37 |
| 2011/0067005 A1* | 3/2011 | Bassin | ................. | G06F 11/008 |
| | | | | 717/127 |
| 2013/0033992 A1* | 2/2013 | Higuchi | ............. | H04W 72/085 |
| | | | | 370/246 |
| 2014/0325480 A1* | 10/2014 | Bhagavatula | ....... | G06F 11/3688 |
| | | | | 717/124 |
| 2014/0380277 A1* | 12/2014 | Bhagavatula | ....... | G06F 11/3684 |
| | | | | 717/124 |
| 2015/0293837 A1* | 10/2015 | Rajamanickam | ... | G06F 11/3676 |
| | | | | 717/130 |
| 2015/0309918 A1* | 10/2015 | Raghavan | .......... | G06F 11/3684 |
| | | | | 714/38.1 |

* cited by examiner

METHOD OF OPTIMIZING EXECUTION OF TEST CASES AND A SYSTEM THEREOF

This application claims the benefit of Indian Patent Application No. 2098/CHE/2014 filed Apr. 25, 2014, which is hereby incorporated by reference in its entirety.

FIELD OF INVENTION

The present subject matter is related, in general to software testing, and more particularly, but not exclusively to a method and system for optimizing execution of test cases during software testing.

BACKGROUND

Software failures can place a business at risk and affect the credibility of software development and information technology developers in the eyes of technology users. Therefore, extensive testing of software applications is an important part of software development. In complex software products which have many interacting capabilities, it can be extremely difficult to isolate performance problems. Running one or two tests and profiling them is unlikely to show the cause of the performance problem unless it is obvious. There is also the problem that regression test suites may grow exponentially in size when more product features are included.

Conventional risk testing methods involve identifying static values of risk factors and reassessing the risk for test cases based on the identified static values of risk factors. However, such risk assessment provides few complications in analyzing the risk and hence not suitable for assessing risk that is produced during runtime of the software. Further, all test cases are subjected to risk assessment irrespective of the profile of risk involved in the test cases, hence consuming more time and involving lengthy manual process.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a computer implemented method of optimizing execution of test cases by a test optimization system. The method comprising calculating failure probability level of a plurality of test cases based on a plurality of test results associated with each of the plurality of test cases. Upon calculating the failure probability level, the method determines dynamic risk profile level based on weights assigned to the failure probability level and risk impact parameter of the plurality of test cases. The method further comprising determining one or more set of optimal test cases to be executed from the plurality of test cases based on the dynamic risk profile level of the plurality of test cases and satisfying one or more test rule parameters, and executing the one or more set of optimal test cases.

Further, the present disclosure relates to a test optimization system for optimizing execution of test cases. The system comprises a processor and a memory communicatively coupled to the processor. The memory is configured to store processor-executable instructions, which, on execution, causes the processor to calculate failure probability level of plurality of test cases based on a plurality of test results associated with each of the plurality of test cases. The processor is further configured to determine dynamic risk profile level based on weights assigned to the failure probability level and risk impact parameter of the plurality of test cases. Upon determining the dynamic risk profile level, the processor is configured to determine one or more set of optimal test cases to be executed from the plurality of test cases based on the dynamic risk profile level of the plurality of test cases and satisfying one or more test rule parameters and to execute the one or more set of optimal test cases.

Furthermore, the present disclosure relates to a non-transitory computer readable medium including operations stored thereon that when processed by at least one processor cause a system to perform the acts of calculating failure probability level of plurality of test cases based on a plurality of test results associated with each of the plurality of test cases. The processor further causes the system to perform the act of determining dynamic risk profile level based on weights assigned to the failure probability level and risk impact parameter of the plurality of test cases. Further, the processor causes the system to perform the acts of determining one or more set of optimal test cases to be executed from the plurality of test cases based on the dynamic risk profile level of the plurality of test cases and satisfying one or more test rule parameters and executing the one or more set of optimal test cases.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
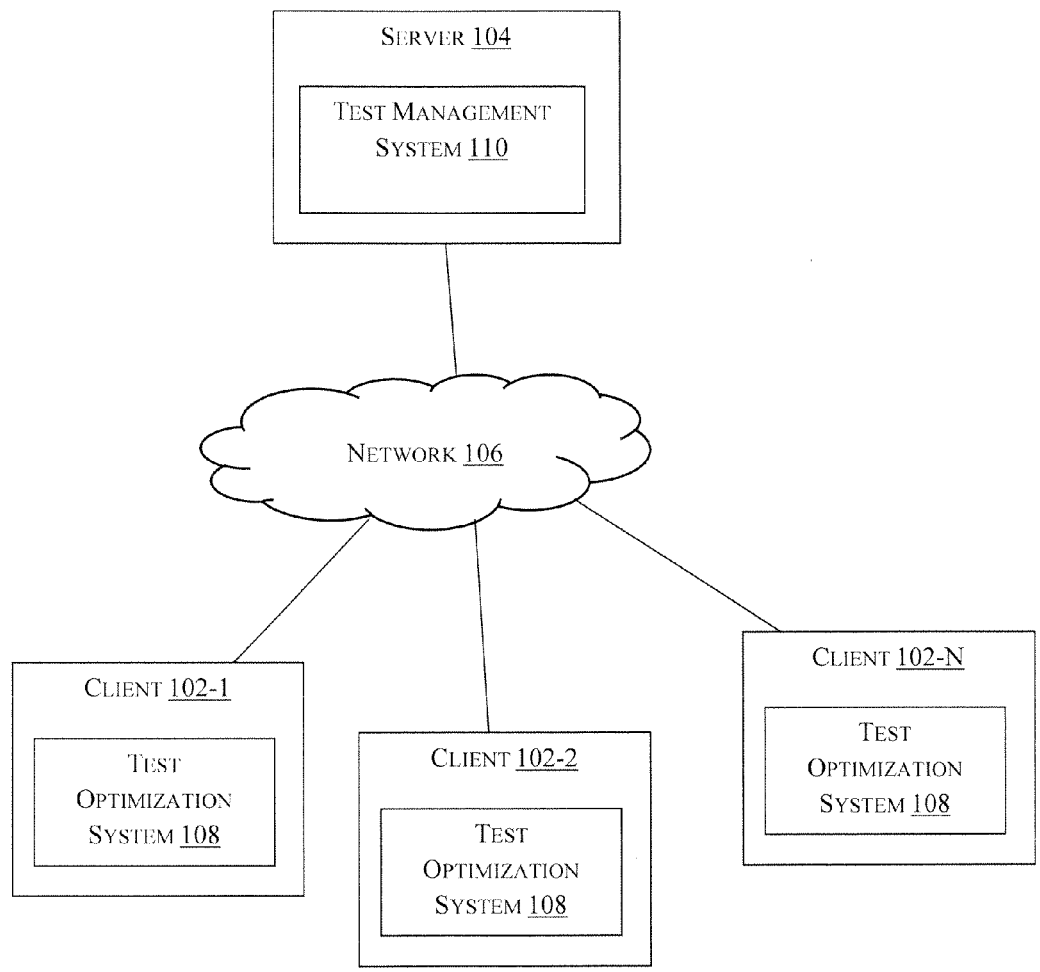
FIG. 1 illustrates architecture of system for optimizing execution of test cases in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Accordingly, the present disclosure relates to a computer implemented method of optimizing execution of test cases by a test optimization system. The method comprising calculating failure probability level of a plurality of test cases based on a plurality of test results associated with each of the plurality of test cases. Upon calculating the failure probability level, the method comprises determining dynamic risk profile level based on weights assigned to the failure probability level and risk impact parameter of the plurality of test cases. The method further comprising determining one or more set of optimal test cases to be executed from the plurality of test cases based on the dynamic risk profile level of the plurality of test cases and satisfying one or more test rule parameters and executing the one or more set of optimal test cases.

Further, the present disclosure relates to a test optimization system for optimizing execution of test cases. The system comprises a processor and a memory communicatively coupled to the processor. The memory is configured to store processor-executable instructions, which, on execution, causes the processor to calculate failure probability level of plurality of test cases based on a plurality of test results associated with each of the plurality of test cases. The processor is further configured to determine dynamic risk profile level based on weights assigned to the failure probability level and risk impact parameter of the plurality of test cases. Upon determining the dynamic risk profile level, the processor is configured to determine one or more set of optimal test cases to be executed from the plurality of test cases based on the dynamic risk profile level of the plurality of test cases and satisfying one or more test rule parameters and execute the one or more set of optimal test cases.

Furthermore, the present disclosure relates to a non-transitory computer readable medium including operations stored thereon that when processed by at least one processor cause a system to perform the acts of calculating failure probability level of plurality of test cases based on a plurality of test results associated with each of the plurality of test cases. The processor further causes the system to perform the act of determining dynamic risk profile level based on weights assigned to the failure probability level and risk impact parameter of the plurality of test cases. Further, the processor causes the system to perform the acts of determining one or more set of optimal test cases to be executed from the plurality of test cases based on the dynamic risk profile level of the plurality of test cases and satisfying one or more test rule parameters and executing the one or more set of optimal test cases.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary computer system for dynamic risk based testing in accordance with some embodiments of the present disclosure.

As shown in FIG. 1, a system 100 for optimizing execution of test cases comprises one or more components coupled with each other. In one implementation, the system 100 comprises one or more client devices 102-1, 102-2, . . . 102-N (collectively referred to as client devices 102). Examples of the client devices 102 include, but are not limited to, a desktop computer, a portable computer, a mobile phone, a handheld device, a workstation. The client devices 102 may be used by various stakeholders or end users of the organization, such as project managers, database administrators and application developers. As shown in the FIG. 1, such client devices 102 are communicatively coupled to a server 104 through a network 106 for facilitating one or more client devices 102 to access and/or operate a test management system (TMS) 110 of the server 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

The client devices 102 comprises a Test Optimization System (TOS) 108 that may be implemented in a variety of computing systems, such as a laptop computer, a desktop computer, a notebook, a workstation, a mainframe computer, a server, a network server, and the like.

Figure 2:
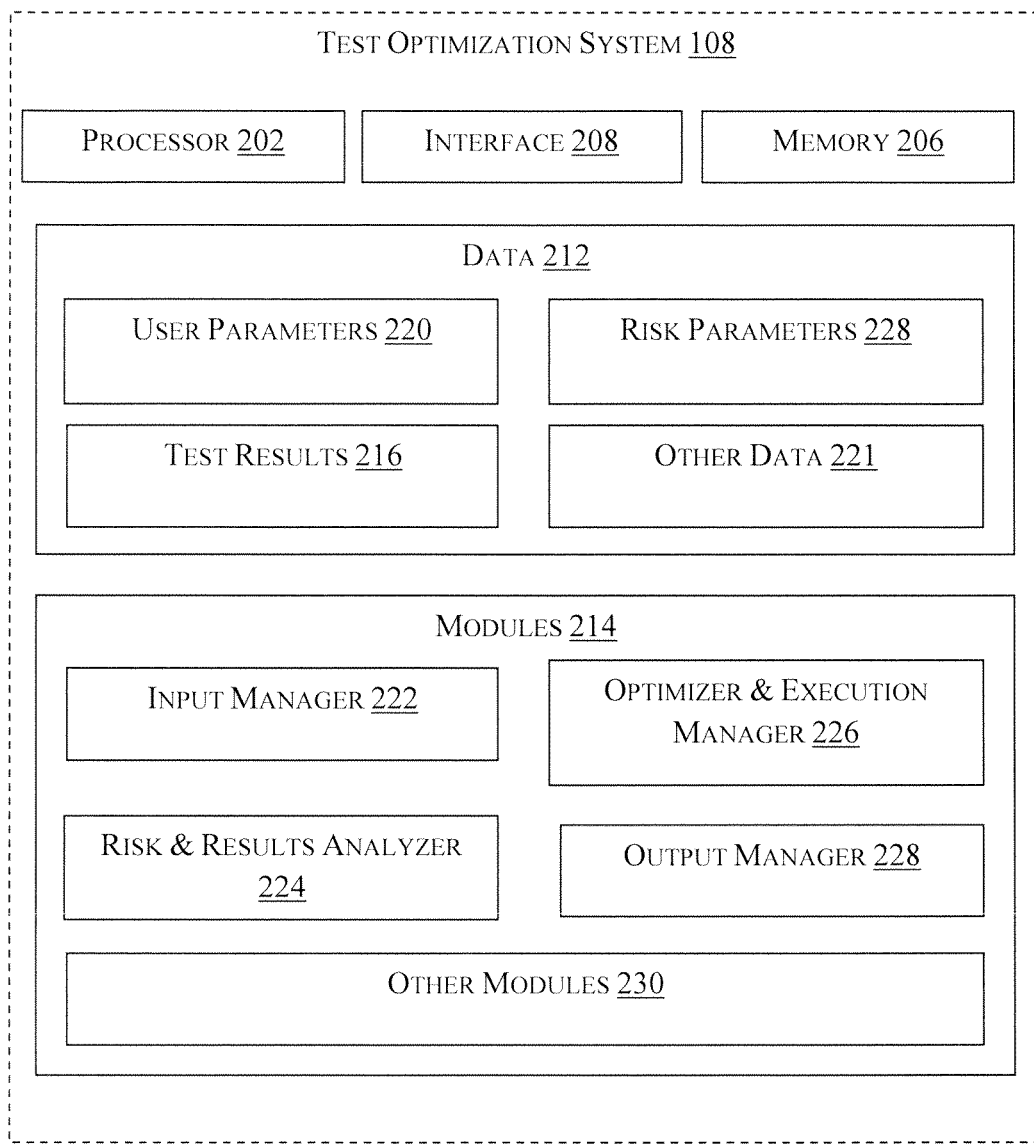
FIG. 2 illustrates a block diagram of Test Optimization System for optimizing execution of test cases in accordance with some embodiments of the present disclosure.

In one implementation, the TOS 108, as shown in FIG. 2, includes a central processing unit ("CPU" or "processor") 202, a memory 206 and an Interface 208. Processor 202 may comprise at least one data processor for executing program components and for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc. Among other capabilities, the processor 202 is configured to fetch and execute computer-readable instructions stored in the memory 206. The memory 206 can include any non-transitory computer-readable medium known in the art including, for example, volatile memory (e.g., RAM), and/or non-volatile memory (e.g., EPROM, flash memory, etc.).

The interface(s) 208 may include a variety of software and hardware interfaces, for example, a web interface, a graphical user interface, etc. The interface 208 is coupled with the processor 202 and an I/O device. The I/O device is configured to receive inputs from user via the interface 208 and transmit outputs for displaying in the I/O device via the interface 208.

In one implementation, the TOS 108 further comprises data 212 and modules 214. In one example, the data 212 and the modules 214 may be stored within the memory 206. In one example, the modules 214, amongst other things, include routines, programs, objects, components, and data structures, which perform particular tasks or implement particular abstract data types. The modules 214 may also be implemented as, signal processor(s), state machine(s), logic circuitries, and/or any other device or component that manipulate signals based on operational instructions. Further, the modules 214 can be implemented by one or more hardware components, by computer-readable instructions executed by a processing unit, or by a combination thereof.

In one implementation, the data 212 may include, for example, test results 216, risk parameters 218, user parameters 220 and other data 221. In one embodiment, the data 212 may be stored in the memory 206 in the form of various data structures. Additionally, the aforementioned data can be organized using data models, such as relational or hierarchical data models. The other data 221 may be used to store data, including temporary data and temporary files, generated by the modules 214 for performing the various functions of the TOS 108.

The modules 214 may include, for example, an input manager (IM) 222, a Risk & Results Analyzer (RRA) 224, an Optimizer & Execution Manager (OEM) 226, and an output manager (OM) 228 coupled with the processor 202. The TOS 108 may also comprise other modules 230 to perform various miscellaneous functionalities of the TOS 108. It will be appreciated that such aforementioned modules may be represented as a single module or a combination of different modules.

In operation, the IM 222 receives one or more inputs from the TMS 110 for determining the dynamic risk associated with the plurality of test cases. For example, the IM 222 receives a plurality of historic or past test results 216 from the TMS 110. Further, the IM 222 receives one or more risk impact parameters 228, predefined weights associated to failure probability value and weights of the one or more risk impact parameters from the user or from the TMS 110. The one or more risk parameters 228 may be for example, probability and impact, and the weights associated with the one or more risk parameters 228 may be equal or unequal.

Figure 3A:
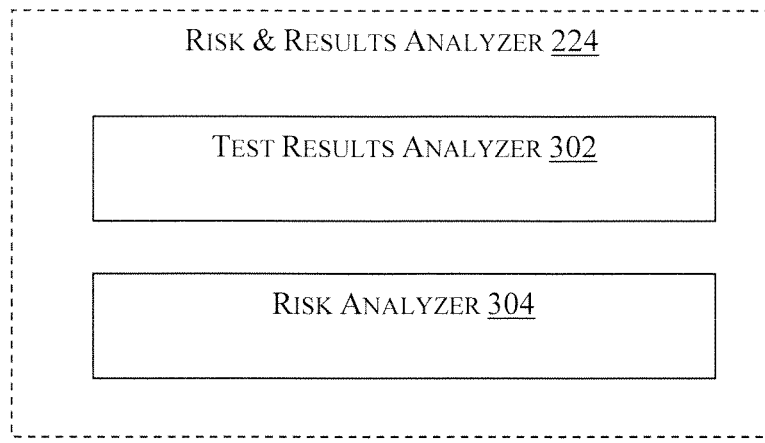
FIG. 3A illustrates a block diagram of a Risk & Results Analyzer (RRA) in accordance with some embodiments of the present disclosure.

Based on the inputs received by the IM 222 from the TMS 110, dynamic risk profile of each test case is determined by the RRA 224. As illustrated in FIG. 3, the RRA 224 comprises a Test Results Analyzer (TRA) 302 and a Risk Analyzer (RA) 304 coupled with each other. The TRA 302 calculates a level of failure probability factor based on the plurality of test results obtained from multiple cycles of testing in the TMS 110. The level of failure probability factor is calculated based on a failure probability value determined for the plurality of received test results. The TRA 302 determines the failure probability value based on the count of failure of the plurality of test cases (A) and count of number of times the plurality of test cases is executed (B).

Upon calculating the failure probability value, the level of failure probability factor is determined by comparing the calculated failure probability value with the one or more failure probability threshold values as illustrated in Table A. The level of failure probability factor thus determined by TRA 302 may be one of High, Medium and Low levels. For example, the level of failure probability factor for a test case may be considered "High" if the test case fails more than 75% of the time. Similarly, a "low" probability indicates that the test case fails less than or equal to 25% of the time. A medium probability may indicate test cases that fail between 25% and 75% of the time. Based on the determined failure probability factor level, the RA 304 determines the dynamic risk profile of the plurality of test cases.

TABLE A

| Failure Probability Threshold Assessment | Probability of Failure (Number of times Test Case failed/Number of times Test Case has been executed) |
|---|---|
| High Threshold | 0.75 |
| Low Threshold | 0.25 |

The RA 304 determines the dynamic risk profile of the plurality of test cases based on a weight of failure probability factor and the one or more risk parameters. In one embodiment, the RA 304 receives the level of failure probability factor of the plurality of test cases determined by TRA 302 and the one or more risk parameters of the plurality of test cases from the TMS 110. The one or more risk parameters may be for example, an impact parameter. Further, the RA 304 may assign weights to the level of failure probability factor and to the one or more risk impact parameter using exemplary weights as defined in Table B and Table C. In an embodiment, the values of the impact parameter may be predefined in the TMS 110 and alternatively, the default weights may be provided by the user.

TABLE B

| Failure Probability Risk Assessment | Weighted Failure Probability |
|---|---|
| High | 9 |
| Medium | 3 |
| Low | 1 |

TABLE C

| Impact Assessment | Weighted Impact |
| --- | --- |
| High | 9 |
| Medium | 3 |
| Low | 1 |

Based on the weighted failure probability level and weighted risk impact parameter, the RA 304 determines a risk profile score of the plurality of test cases. In one example, the RA 304 determines the risk profile score of the plurality of test cases as a product of the weighted failure probability level and weighted risk parameter.

Further, the IM 222 receives one or more user parameters 120 and associated weights from the TMS 110. In one embodiment, the user parameters may be, for example usability, requirement complexity that contributes to the risk level associated with a test case. In one example, the values of the user parameters and the associated weights may be predefined in the TMS 110.

Based on the determined risk profile score, the RA 304 determines a risk profile for the plurality of test cases. In one embodiment, the RA 304 determines the risk profile by comparing the risk profile score of the plurality of test cases with one or more risk profile predefined threshold values based on one or more conditions or rules. The risk profile threshold values are illustrated in Table D and one or more conditions or rules are illustrated in Table E and Table F.

TABLE D

| Risk Threshold Assessment | Risk Profile Score |
| --- | --- |
| High | 27 |
| Medium | 9 |
| Low | 3 |

TABLE E

| Risk Profile Score | Risk Profile Category | Profiles Mapped |
| --- | --- | --- |
| >=27 | High Risk | Profile 1, 2, 3 |
| >=9 and <27 | Medium Risk | Profile 4, 5, 6 |
| >=3 and <9 | Low Risk | Profile 7, 8 |
| <3 | Very Low Risk | Profile 9 |

TABLE F

| Failure Probability | Impact | | |
| --- | --- | --- | --- |
| | Low | Medium | High |
| Low | Profile 9 | Profile 8 | Profile 6 |
| Medium | Profile 7 | Profile 5 | Profile 3 |
| High | Profile 4 | Profile 2 | Profile 1 |

Based on the comparison, a risk profile is assigned to the plurality of test cases. The risk profile, for example, may be one of High, Medium, Low and Very Low risk profiles numbered from 1-9. Upon determining the risk profile for the plurality of test cases, the OEM 226 identifies one or more optimal set of test cases.

Figure 3B:
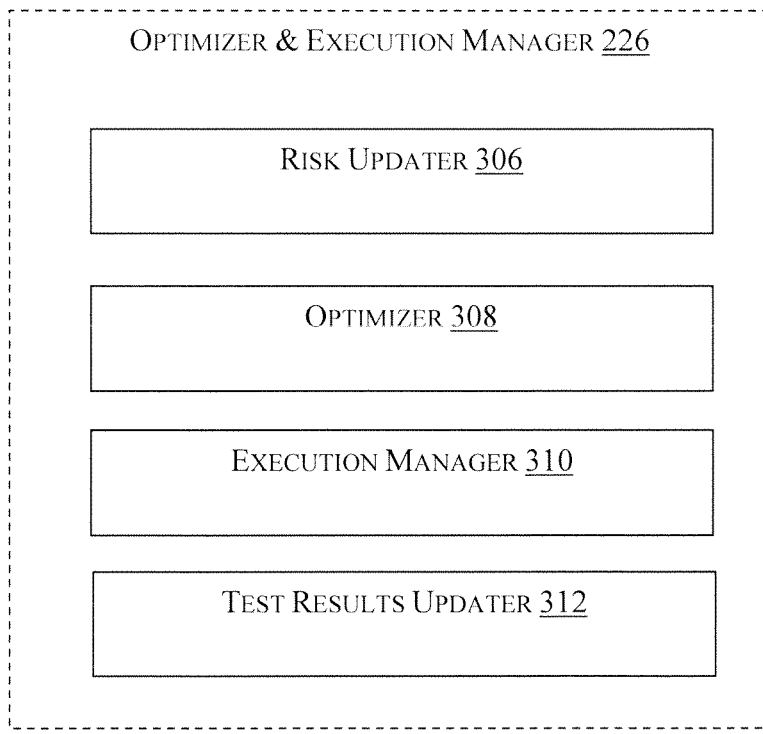
FIG. 3B illustrates a block diagram of Optimizer & Execution Manager (OEM) in accordance with some embodiments of the present disclosure.

As illustrated in FIG. 3B, the OEM 226 comprises at least a Risk Updater (RU) 306, an optimizer 308, an Execution Manager (EM) 310 and a Test Results Updater (TRU) 312. The RU 306 transmits the risk profile of the plurality of test cases determined by the RA 304 to the TMS 110. In one embodiment, the RU 306 establishes a connection with the TMS 110 and transmits the dynamic risk profiles of each of the plurality of test cases for updating in the TMS 110. Based on the updated dynamic risk profiles, the optimizer 308 determines one or more optimal set of test cases from among the plurality of test cases.

In one embodiment, the optimizer 308 receives dynamic risk profiles of the plurality of test cases and determines one or more optimal set of test cases based on the received dynamic risk profiles (alternately referred to as criticality) and one or more parameters such as for example, dependency and requirement impact. The optimizer 308 is configured to implement one or more test rule parameters or conditions for determining the one or more set of optimal test cases, as illustrated in below Table G.

TABLE G

| Criticality | Requirement Impacted | Dependency | High Risk Profile (1, 2, 3) | Medium Risk Profile (4, 5, 6) | Low Risk Profile (7, 8) | Very Low Risk Profile (9) |
| --- | --- | --- | --- | --- | --- | --- |
| Y | Y | N | Select | Select | Select | Select |
| Y | N | Y | Select | Select | Select | Eliminate |
| Y | N | N | Select | Select | Eliminate | Eliminate |
| N | Y | N | Select | Select | Select | Eliminate |
| N | N | Y | Select | Select | Eliminate | Eliminate |
| N | N | N | Select | Eliminate | Eliminate | Eliminate |

For example, one or more test rule parameters may include, but are not limited to, determination of criticality requirement, impact requirement, or dependencies between the requirements. Based on the results of one or more rules or conditions implemented on the plurality of test cases, the optimizer 308 identifies one or more set of optimal test cases for further processing. The optimizer 308 also eliminates non-identified test cases from further processing. Upon identifying one or more optimal set of test cases, the optimizer 308 determines the sequence in which the identified optimal set of test cases is to be executed. In one embodiment, the optimizer 308 determines the sequence of executing the identified optimal set of test cases based on one or more test sequence parameters as illustrated in Table H below.

TABLE H

| Criticality | Requirement Impacted | Dependency | High Risk Profile (Profiles 1, 2, 3) | Medium Risk Profile (Profiles 4, 5, 6) | Low Risk Profile (Profiles 7, 8) | Very Low Risk Profile (Profile 9) |
|---|---|---|---|---|---|---|
| Y | Y | N | Sequence1 | Sequence1 | Sequence1 | Sequence1 |
| Y | N | Y | Sequence3 | Sequence3 | Sequence3 | NA |
| Y | N | N | Sequence5 | Sequence5 | NA | NA |
| N | Y | N | Sequence2 | Sequence2 | Sequence2 | NA |
| N | N | Y | Sequence4 | Sequence4 | NA | NA |
| N | N | N | Sequence6 | NA | NA | NA |

For example, the one or more test sequence parameters may include, but are not limited to, determination of criticality requirement, impact requirement, or dependencies between the requirements. The sequence number may vary from 1-N, for example, from 1-6.

The EM 310 receives the one or more set of identified optimal test cases from the optimizer 308, executes the received set of optimal test cases in the identified sequence and generates one or more execution results, for example Pass, Fail associated with the one or more identified set of optimal test cases. The TRU 312 is configured to simultaneously receive the one or more execution results of the one or more optimal set of test cases from the EM 310, monitor the received execution results and automatically update the non-executed test cases in the TMS 110. In one embodiment, the TRU 312 transmits the one or more execution results of the one or more optimal set of test cases that are executed by the EM 310 to the TMS 110 for update. The TRU 312 also monitors the updated execution results of one or more set of optimal test cases and implement one or more predetermined conditions, as illustrated in Table I below, to update one or more non-executed test cases in the TMS 110 without executing the one or more non-executed test cases.

TABLE I

| Criticality | Requirement Impacted | Dependency | High Risk Profile (Profiles 1, 2, 3) | Medium Risk Profile (Profiles 4, 5, 6) | Low Risk Profile (Profiles 7, 8) | Very Low Risk Profile (Profile 9) |
|---|---|---|---|---|---|---|
| Y | Y | N | Pass | Pass | Pass | Do not Execute |
| Y | Y | N | Fail | Execute | Execute | Execute |
| Y | Y | N | Pass | Fail | Execute | Execute |
| Y | Y | N | Pass | Pass | Fail | Execute |
| Y | N | Y | Pass | Pass | Do not Execute | NA |
| Y | N | Y | Fail | Execute | Execute | NA |
| Y | N | Y | Pass | Fail | Execute | NA |
| Y | N | N | Pass | Do not Execute | NA | NA |
| Y | N | N | Fail | Execute | NA | NA |
| N | Y | N | Pass | Pass | Do not Execute | NA |
| N | Y | N | Fail | Execute | Execute | NA |
| N | Y | N | Pass | Fail | Execute | NA |
| N | N | Y | Pass | Do not Execute | NA | NA |
| N | N | Y | Fail | Execute | NA | NA |
| N | N | N | Execute | NA | NA | NA |

For example, the predetermined conditions, include, but are not limited to, determination of criticality requirement, impact requirement, or dependencies between the requirements. In one example, the non-executed set of optimal test cases may be updated with inputs, for example, Do not execute.

Upon determining and updating the execution results of all set of optimal test cases in the TMS 110, the TRU 312 generates a completion signal of testing.

Figure 4:
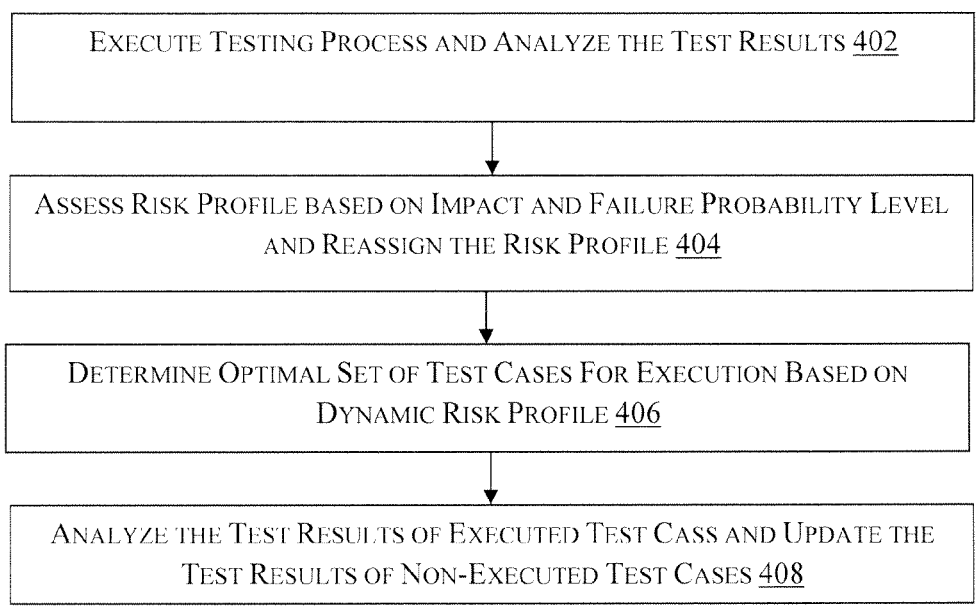
FIG. 4 illustrates a flowchart of method of dynamic risk testing in accordance with some embodiments of the present disclosure.

FIG. 4 illustrates a flowchart of method of dynamic risk testing in accordance with an embodiment of the present disclosure.

As illustrated in FIG. 4, the method 400 comprises one or more blocks for optimizing the execution of plurality of test cases for dynamic risk testing performed by the Test Optimization System (TOS) 108. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware, software, firmware, or combination thereof.

Figure 5:
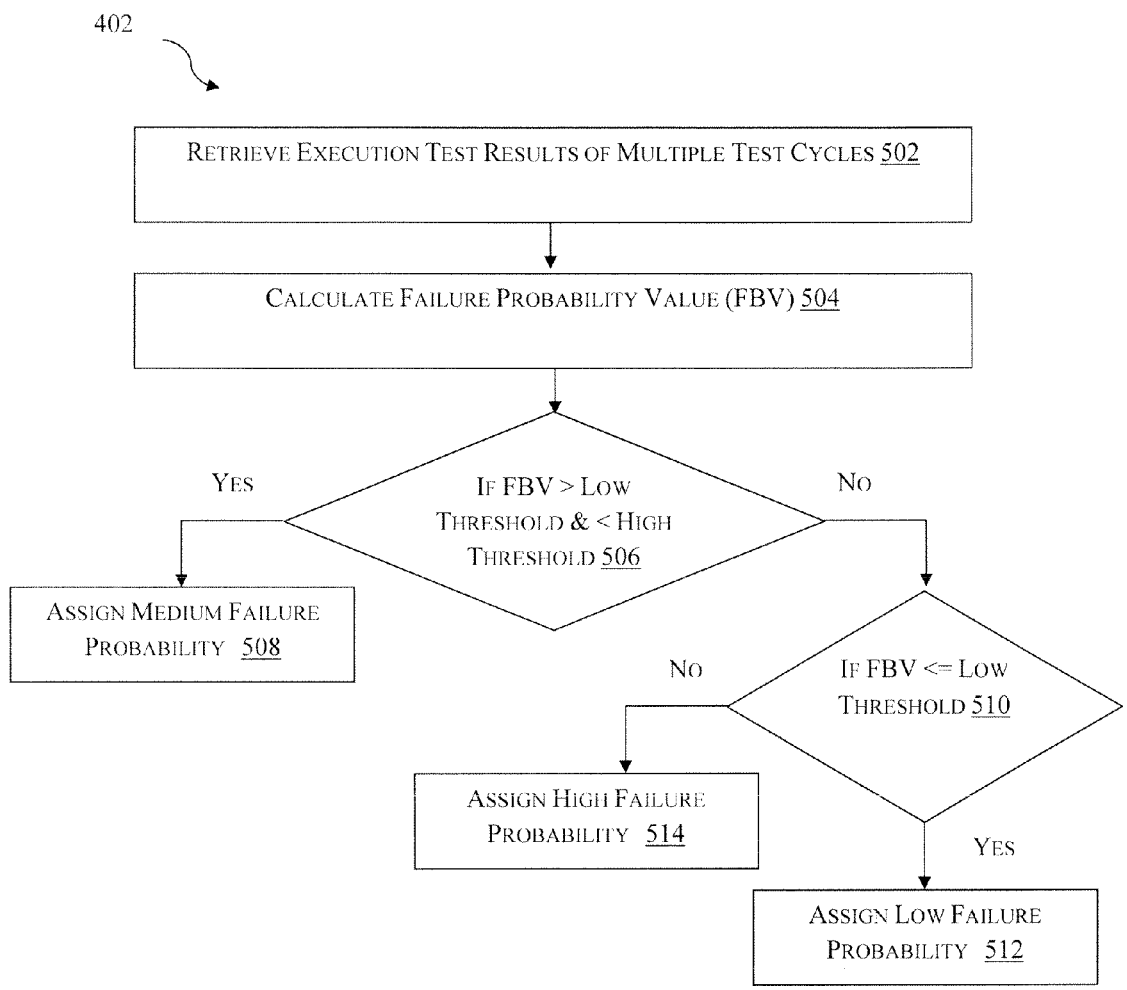
FIG. 5 illustrates a flowchart of method of analyzing test results in accordance with some embodiments of the present disclosure.

At block 402, execute testing process and analyze the test results. In one embodiment, the IM 222 receives a plurality of historic or past test results generated on executing the plurality of test cases from the TMS 110. The TRA 302 receives the plurality of historic or past test results from the IM 222 to determine a failure probability factor level for the plurality of test cases. The determination of failure probability factor level is illustrated in the flowchart in FIG. 5. Also, a sample illustration for failure probability factor level is shown in Table J below:

TABLE J

| Test Case | Result Set 1 | Result Set 2 | Result Set 3 | Result Set 4 | No. of failures (A) | No. of times test case has been executed (B) | A/B | Failure Probability Rating |
|---|---|---|---|---|---|---|---|---|
| TC1 | Passed | Passed | Passed | Passed | 0 | 4 | 0 | Low |
| TC2 | Passed | Failed | Failed | Passed | 2 | 4 | 0.5 | Medium |
| TC3 | Failed | Passed | Failed | Failed | 3 | 4 | 0.75 | High |
| TC4 | Passed | Failed | Passed | Passed | 1 | 4 | 0.25 | Low |

At block 502, retrieve execution results of multiple test cycles. In one embodiment, the IM 222 receives a plurality of historic/past test results 216 of executing the plurality of test cases in multiple test cycles by the TMS 110.

At block 504, the failure probability values for the plurality of test cases are calculated. In one embodiment, the TRA 302 determines failure probability value (FBV) based on the count of failure of the plurality of test cases (A) and count of number of times the plurality of test cases is executed (B). Upon calculating the failure probability value, the TRA 302 determines the level of failure probability factor by comparing the calculated failure probability value with the one or more failure probability threshold values as illustrated in Table B. The level of failure probability factor thus determined by TRA 302 may be one of High, Medium and Low levels.

At blocks 506, the failure probability value FBV is compared with Low and High failure probability threshold. In one embodiment, a determination is made as to whether the FBV exceeds the low failure probability threshold (LFPT) and also lesser than the high failure probability threshold (HFPT). If it is determined that the FBV exceeds the LFPT and is lesser than HFPT, then the method proceeds to block 508 via "YES", otherwise proceeds to block 510 via "NO".

At block 508, Medium failure probability level is assigned to the plurality of test cases. In one embodiment, a medium failure probability level is assigned to the plurality of test cases upon determining that the FBV exceeds the LFPT and is lesser than HFPT at block 506 via the "YES".

At blocks 510, the failure probability value FBV is compared with Low failure probability threshold. In one embodiment, if the determination at block 506 follows the "NO" loop, then a determination is made as to whether the FBV is lesser than or equal to the low failure probability threshold (LFPT). If the determination is TRUE, then the method proceeds to block 512 via "YES", otherwise proceeds to block 514 via "NO".

At block 512, Low failure probability level is assigned to the plurality of test cases. In one embodiment, a low failure probability level is assigned to the plurality of test cases upon determining that the FBV is lesser than or equal to the LFPT at block 510 via the "YES".

At block 514, High failure probability level is assigned to the plurality of test cases. In one embodiment, a high failure probability level is assigned to the plurality of test cases upon determining the FBV is lesser than or equal to the LFPT at block 510 via the "NO".

Upon determining the failure probability level to each of the plurality of test cases, risk profile is determined as illustrated in block 404 and sub-blocks 602-622.

Figure 6:
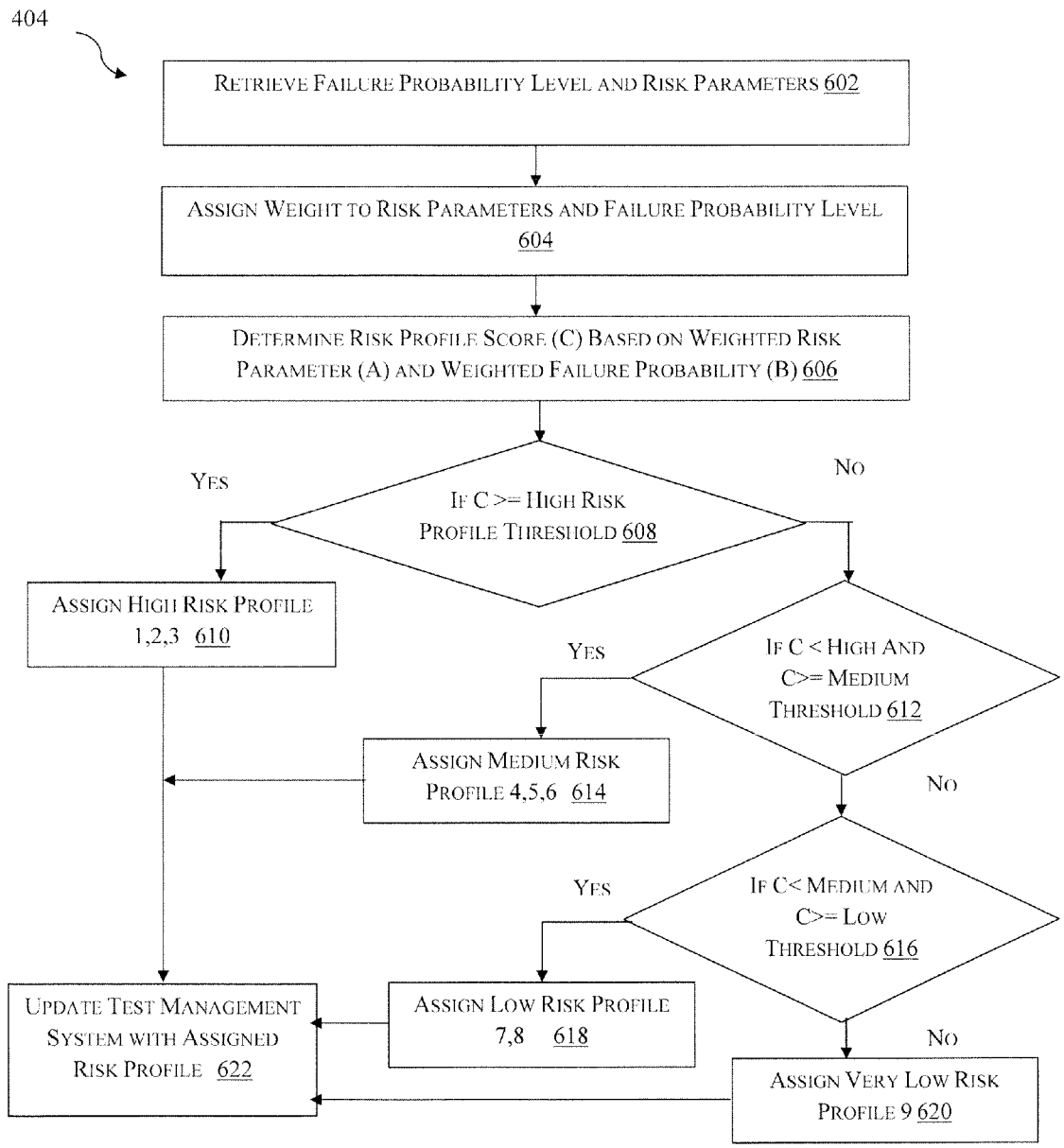
FIG. 6 illustrates a flowchart of method of determining risk level and reassigning the dynamic risk level in accordance with some embodiments of the present disclosure.

At block 404, assess the risk profile based on impact and failure probability level and reassign the risk level. In one embodiment, the failure probability level calculated by the TRA 302 and one or more risk impact parameters predefined in the TMS 110 are obtained for determining dynamic risk profile for the plurality of test cases. The method of determining risk profile for the plurality of test cases is illustrated in the flowchart of FIG. 6. Also, a sample illustration for risk profile determination is best illustrated in Table K below:

TABLE K

| Test Case | Impact | Failure Probability | Risk Score | Risk Profile |
|---|---|---|---|---|
| TC1 | High | High | 81 | Profile 1 |
| TC2 | High | Medium | 27 | Profile 3 |
| TC3 | Medium | Low | 3 | Profile 8 |
| TC4 | Low | High | 9 | Profile 4 |
| TC5 | Low | Low | 1 | Profile 9 |

At block 602, retrieve failure probability level and risk parameters. In one embodiment, the RA 304 receives the failure probability level calculated by the TRA 302 and one or more risk impact parameters predefined in the TMS 110.

At block 604, assign weights to risk parameters and the failure probability level. In one embodiment, the RA 304 assigns weights to the level of failure probability factor and to the one or more risk impact parameter using Table A and Table C.

At block 606, determine risk profile score (C) based on the weighted risk parameter (A) and weighted failure probability level (B). In one embodiment, the RA 304 determines the risk profile score of the plurality of test cases as a product of the weighted failure probability level and weighted risk parameter.

At block 608, the risk profile score (C) is compared with the High risk profile threshold (HRPT). In one embodiment, a determination is made as to whether the risk profile score exceeds or equals the HRPT. If the determination is TRUE, then the method proceeds to block 610 via "YES", otherwise proceeds to block 612 via "NO".

At block 610, assign high risk profile. In one exemplary embodiment, the plurality of test cases is assigned with high risk profile 1, 2, and 3 if it is determined that the risk profile score exceeds or equals the HRPT via "YES". Upon assigning the high risk profile, the method further proceeds to block 622.

At block 612, the risk profile score is compared with the High risk profile threshold (HRPT) and Medium risk profile threshold (MRPT). In one embodiment, a determination is made as to whether the risk profile score is lesser than HRPT and exceeds or equals the MRPT. If the determination is TRUE, then the method proceeds to block 614 via "YES", otherwise proceeds to block 616 via "NO".

At block 614, assign medium risk profile. In one embodiment, the plurality of test cases is assigned with medium risk profile 4, 5, and 6 if it is determined that the risk profile score is lesser than HRPT and exceeds or equals the MRPT via "YES". Upon assigning the medium risk profile, the method further proceeds to block 622.

At block 616, the risk profile score is compared with the Medium risk profile threshold (MRPT) and Low risk profile threshold (LRPT). In one embodiment, a determination is made as to whether the risk profile score is lesser than MRPT and exceeds or equals the LRPT. If the determination is TRUE, then the method proceeds to block 618 via "YES", otherwise proceeds to block 620 via "NO".

At block 618, assign low risk profile. In one exemplary embodiment, the plurality of test cases is assigned with low risk profile 7, 8 if it is determined that the risk profile score is lesser than MRPT and exceeds or equals the LRPT via "YES". Upon assigning the low risk profile, the method further proceeds to block 622.

At block 620, assign very low risk profile. In one embodiment, the plurality of test cases is assigned with very low risk profile 9 if it is determined that the risk profile score is lesser than LRPT via "NO". Upon assigning the very low risk profile, the method further proceeds to block 622.

At block 622, update TMS with the assigned risk profile. In one embodiment, the RU 306 establishes connection with the TMS 110 and transmits the risk profile of each test case for updating. Based on the determined risk profile of the plurality of test cases, one or more optimal set of test cases are determined in block 406 and sub-blocks 702-724.

Figure 7:
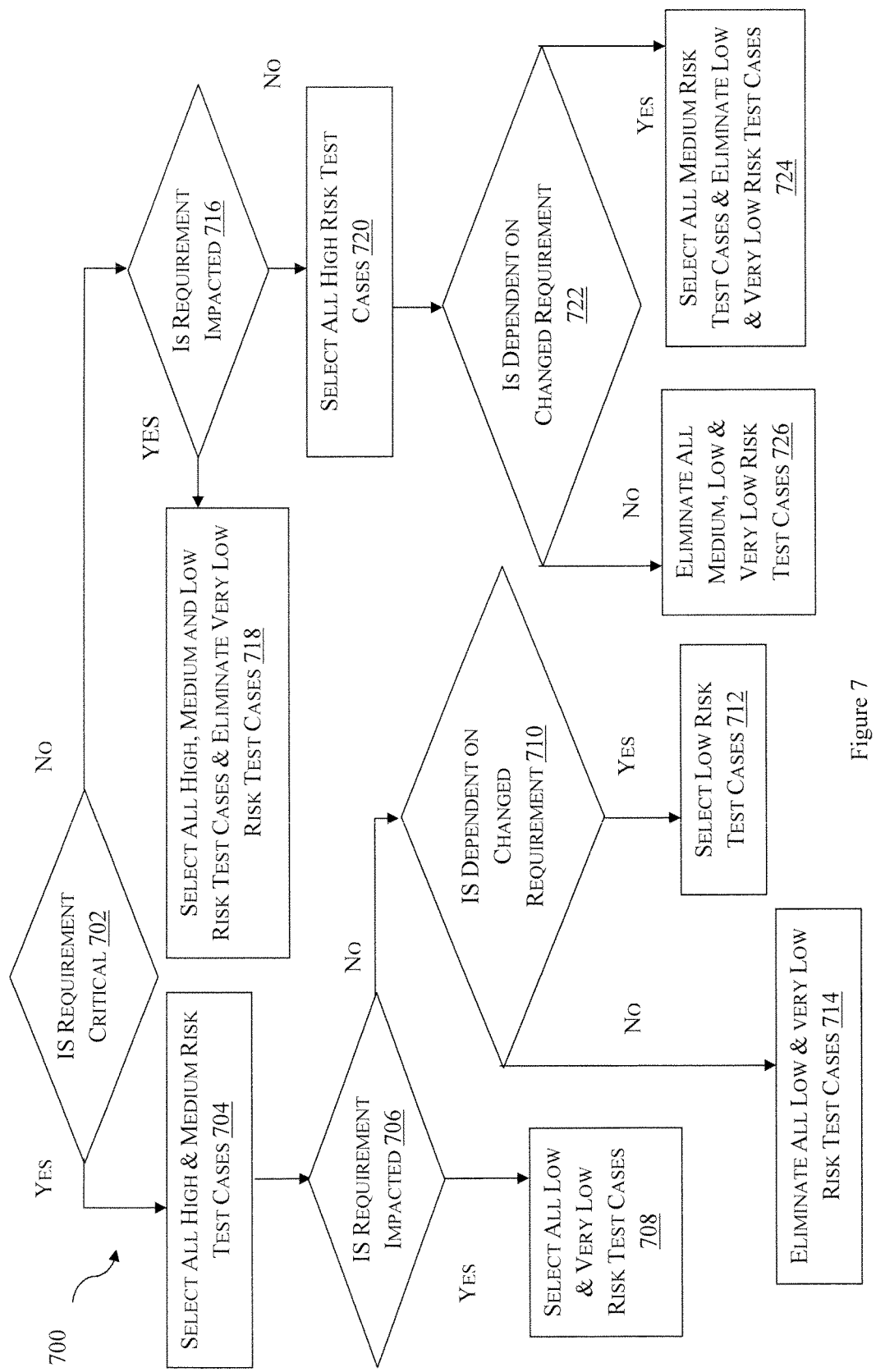
FIG. 7 illustrates a flowchart of method of determining optimal set of test cases in accordance with some embodiments of the present disclosure.

At block 406, determine optimal set of test cases for execution based on dynamic risk profile. In one embodiment, the optimizer 308 is configured to receive dynamic risk profiles of the plurality of test cases and determine one or more optimal set of test cases based on the received dynamic risk profiles and one or more test rule parameters including dependency and requirement impact. The optimizer 308 is configured to implement one or more rules or conditions for determining the one or more set of optimal test cases, as illustrated in Table G. For example, one or more test rule parameters include, but are not limited to, determination of criticality requirement, impact requirement, or dependencies between the requirements. Based on the results of one or more rules or conditions applied on the plurality of test cases, the one or more set of optimal test cases are identified and selected for further processing. The optimizer 308 is also configured to eliminate unidentified non-selected test cases for further processing. The method of determining one or more set of optimal test cases is illustrated in the flowchart 700 of FIG. 7.

The method 700 may be described in the general context of computer executable instructions. Generally, computer executable instructions can include routines, programs, objects, components, data structures, procedures, modules, and functions, which perform particular functions or implement particular abstract data types. The order in which the method 700 is described is not intended to be construed as a limitation, and any number of the described method blocks can be combined in any order to implement the method 700. Additionally, individual blocks may be deleted from the method 700 without departing from the spirit and scope of the subject matter described herein. Furthermore, the method 700 can be implemented in any suitable hardware, software, firmware, or combination thereof.

At block 702, determination is made as to whether the criticality requirement is satisfied. In one embodiment, if the determination is TRUE, then the method proceeds to block 704 via "YES", otherwise proceeds to block 716 via "NO".

At block 704, select all High and Medium risk test cases. In one embodiment, all test cases assigned with High and Medium risk profile are identified as one or more set of optimal test cases.

At block 706, determination is made as to whether the impact requirement is satisfied. In one embodiment, if the determination is TRUE, then the method proceeds to block 708 via "YES", otherwise proceeds to block 710 via "NO".

At block 708, select all Low and Very Low risk test cases. In one embodiment, all test cases assigned with Low and Very Low risk profile are identified as one or more set of optimal test cases.

At block 710, determination is made as to whether the dependency requirement is satisfied. In one embodiment, if the determination is TRUE, then the method proceeds to block 712 via "YES", otherwise proceeds to block 714 via "NO".

At block 712, select all Low risk test cases. In one embodiment, all test cases assigned with Low risk profile are identified as one or more set of optimal test cases.

At block 714, eliminate all Low & Very Low risk test cases. In one embodiment, all test cases assigned with Low & Very Low risk profile are eliminated from being included in the one or more set of optimal test cases.

At block 716, determination is made as to whether the impact requirement is satisfied. In one embodiment, if the determination is TRUE, then the method proceeds to block 718 via "YES", otherwise proceeds to block 720 via "NO".

At block 718, all high, medium, and low risk test cases are selected and very low risk test cases are eliminated. In one embodiment, all test cases assigned with high, medium and low risk profile are selected and test cases assigned with very low risk profile are eliminated.

At block 720, select all High risk test cases. In one embodiment, all test cases assigned with High risk profile are identified as one or more set of optimal test cases.

At block 722, determination is made as to whether the dependency requirement is satisfied. In one embodiment, if the determination is TRUE, then the method proceeds to block 724 via "YES", otherwise proceeds to block 726 via "NO".

At block 724, select all Medium risk test cases and eliminate low and very low risk test cases. In one embodiment, all test cases assigned with Medium risk profile are identified as one or more set of optimal test cases. Further, all test cases assigned with Low and Very low risk profile are eliminated from being included in the one or more set of optimal test cases.

At block 726, eliminate all Medium, Low and Very Low risk test cases. In one embodiment, all test cases assigned with Medium, Low and Very Low risk profile are eliminated from being included in the one or more set of optimal test cases.

Upon identifying one or more optimal set of test cases, the optimizer 308 determines the sequence in which the identified optimal set of test cases is to be executed. In one embodiment, the optimizer 308 determines the sequence of executing the identified optimal set of test cases based on one or more test sequence parameters as illustrated in Table H. For example, the one or more test sequence parameters may include determination of criticality requirement, impact requirement, or dependencies between the requirements. The sequence number may vary from 1-N, for example, 1-6.

Figure 8:
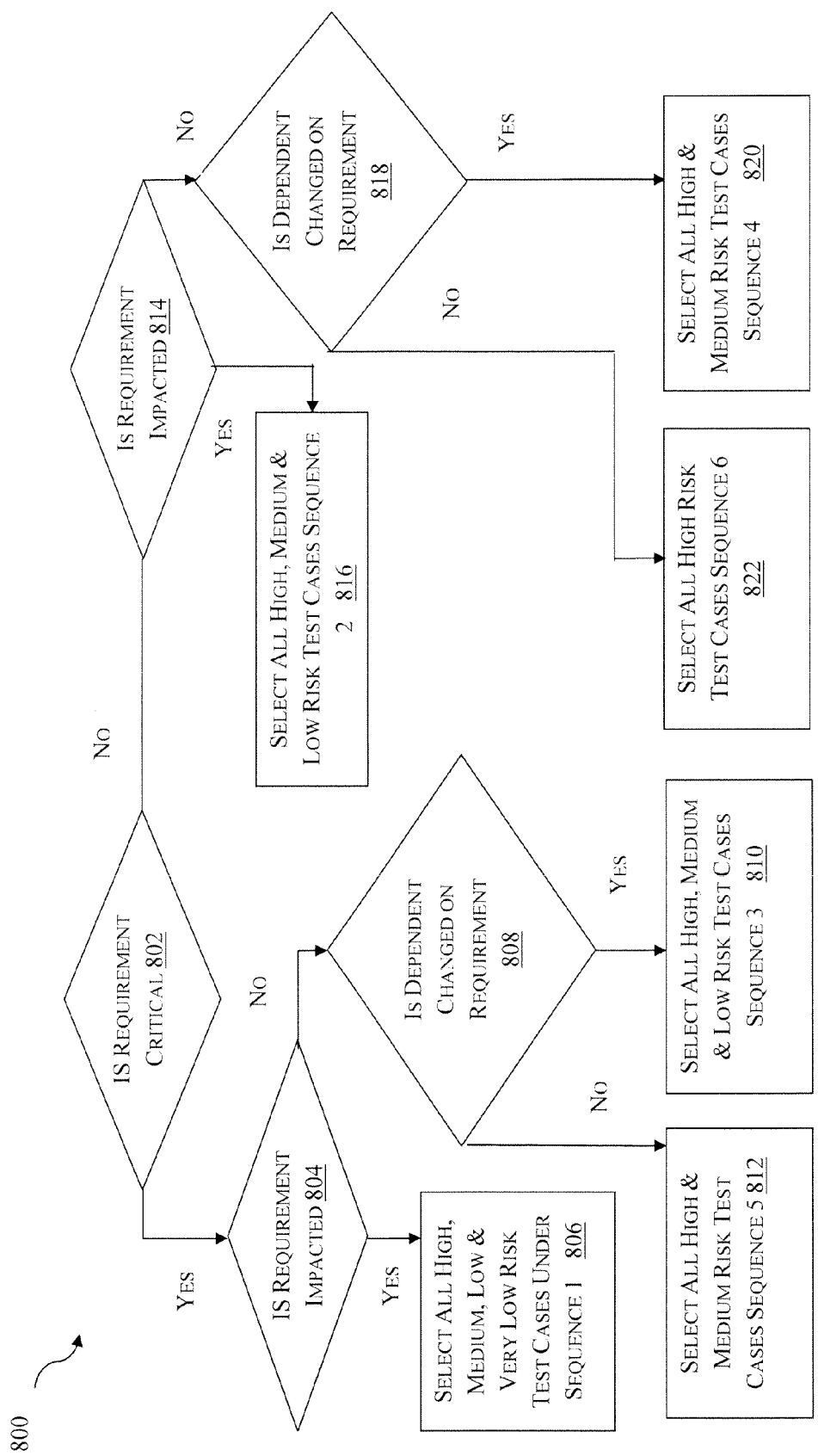
FIG. 8 illustrates a flowchart of method of determining sequence of executing optimal set of test cases in accordance with some embodiments of the present disclosure.

Upon determining the one or more set of optimal test cases, the block 406 proceeds to determine the sequence of executing the one or more set of optimal test cases thus determined as illustrated in flowchart 800 of FIG. 8.

The method 800 may be described in the general context of computer executable instructions. Generally, computer executable instructions can include routines, programs, objects, components, data structures, procedures, modules, and functions, which perform particular functions or implement particular abstract data types. The order in which the method 800 is described is not intended to be construed as a limitation, and any number of the described method blocks can be combined in any order to implement the method 800. Additionally, individual blocks may be deleted from the method 800 without departing from the spirit and scope of the subject matter described herein. Furthermore, the method 800 can be implemented in any suitable hardware, software, firmware, or combination thereof.

At block 802, determination is made as to whether the criticality requirement is satisfied. In one embodiment, if the determination is TRUE, then the method proceeds to block 804 via "YES", otherwise proceeds to block 814 via "NO".

At block 804, determination is made as to whether the impact requirement is satisfied. In one embodiment, if the determination is TRUE, then the method proceeds to block 806 via "YES", otherwise proceeds to block 808 via "NO". At block 806, select all High, Medium, Low and Very Low risk test cases under sequence 1.

At block 808, determination is made as to whether the dependency requirement is satisfied. In one embodiment, if the determination is TRUE, then the method proceeds to block 810 via "YES", otherwise proceeds to block 812 via "NO".

At block 810, all High, Medium and Low risk test cases are selected under sequence 3. At block 812, all High and Medium risk test cases are selected under sequence 5.

At block 814, determination is made as to whether the impact requirement is satisfied. In one embodiment, if the determination is TRUE, then the method proceeds to block 816 via "YES", otherwise proceeds to block 820 via "NO".

At block 816, all High, Medium and Low risk test cases are selected under sequence 2.

At block 818, determination is made as to whether the dependency requirement is satisfied. In one embodiment, if the determination is TRUE, then the method proceeds to block 820 via "YES", otherwise proceeds to block 822 via "NO".

At block 820, all High and Medium risk test cases are selected under sequence 4. At block 822, all High risk test cases are selected under sequence 6.

On determining the sequence of executing the one or more set of optimal test cases, the method 400 proceeds to block 408.

At block 408, analyze the test results of executed test cases and update the non-executed test cases. In one implementation, the one or more set of optimal test cases identified are executed in the determined sequence and the execution results are updated in the TMS 110. The EM 310 is configured to receive the one or more set of optimal test cases in the identified sequence from the optimizer 308, execute the same in the identified sequence and generate one or more execution results, for example Pass, Fail.

The TRU 312 is configured to simultaneously receive the one or more execution results of the one or more optimal set of test cases from the EM 310, monitor the received execution results and automatically update the non-executed test cases in the TMS 110. In one embodiment, the TRU 312 transmits the one or more execution results of the one or more optimal set of test cases that are executed by the EM 310 to the TMS 110 for update. The TRU 312 also monitors the updated execution results of one or more set of optimal test cases and implement one or more rules or conditions to determine the execution results of non-executed optimal test cases without executing the same as illustrated in flowchart 900 of FIGS. 9 and 10. One or more rules or conditions, as illustrated in Table I, include determination of criticality requirement, impact requirement, or dependencies between the requirements. In one example, the non-executed set of optimal test cases may be updated like for example, Do not execute.

The method 900 may be described in the general context of computer executable instructions. Generally, computer executable instructions can include routines, programs, objects, components, data structures, procedures, modules, and functions, which perform particular functions or implement particular abstract data types. The order in which the method 900 is described is not intended to be construed as a limitation, and any number of the described method blocks can be combined in any order to implement the method 900. Additionally, individual blocks may be deleted from the method 900 without departing from the spirit and scope of the subject matter described herein. Furthermore, the method 900 can be implemented in any suitable hardware, software, firmware, or combination thereof.

Figure 9:
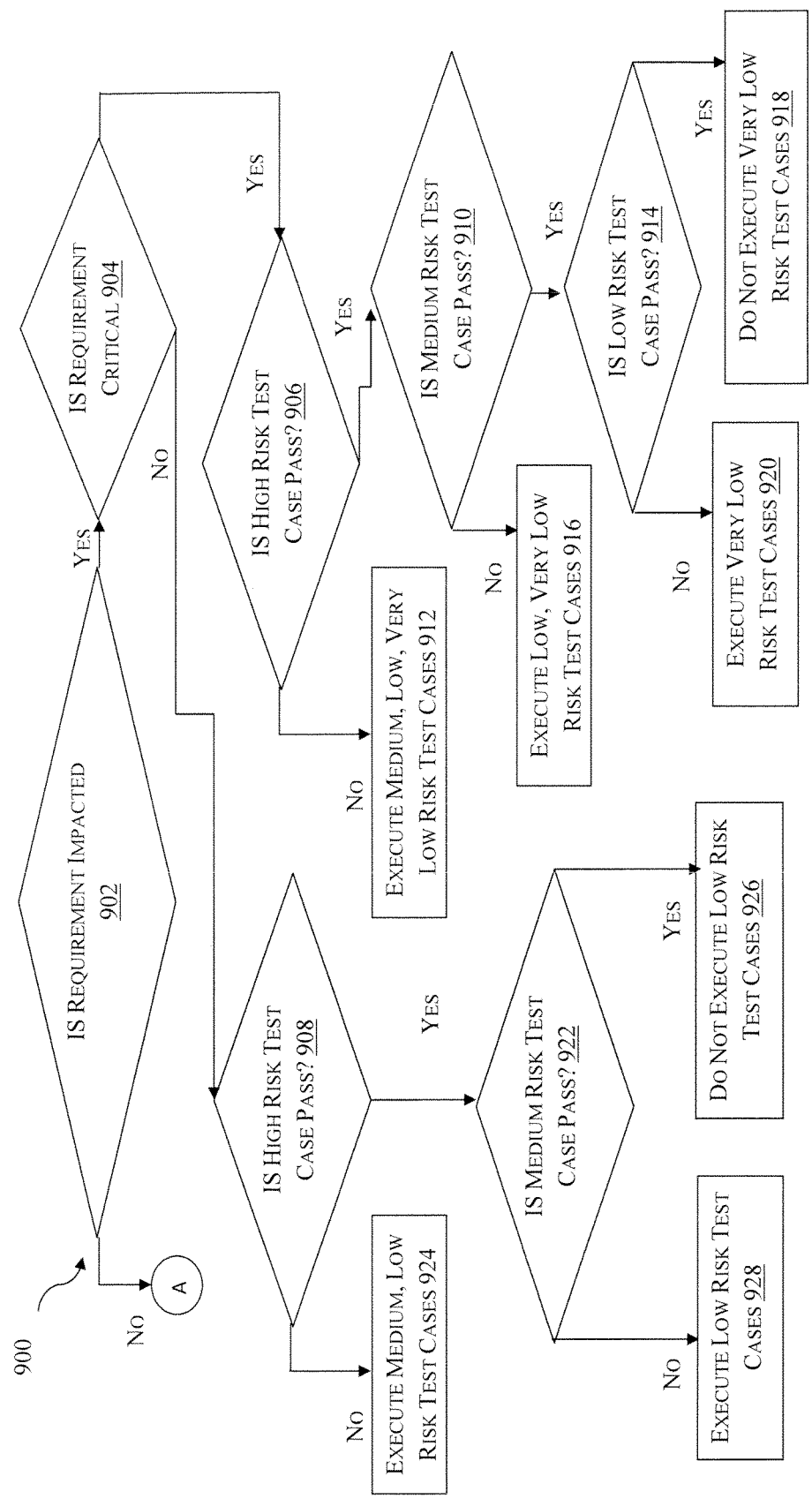
FIGS. 9 and 10 illustrate flowcharts of method of optimizing execution of optimal set of test cases in determined sequence in accordance with some embodiments of the present disclosure.
Figure 10:
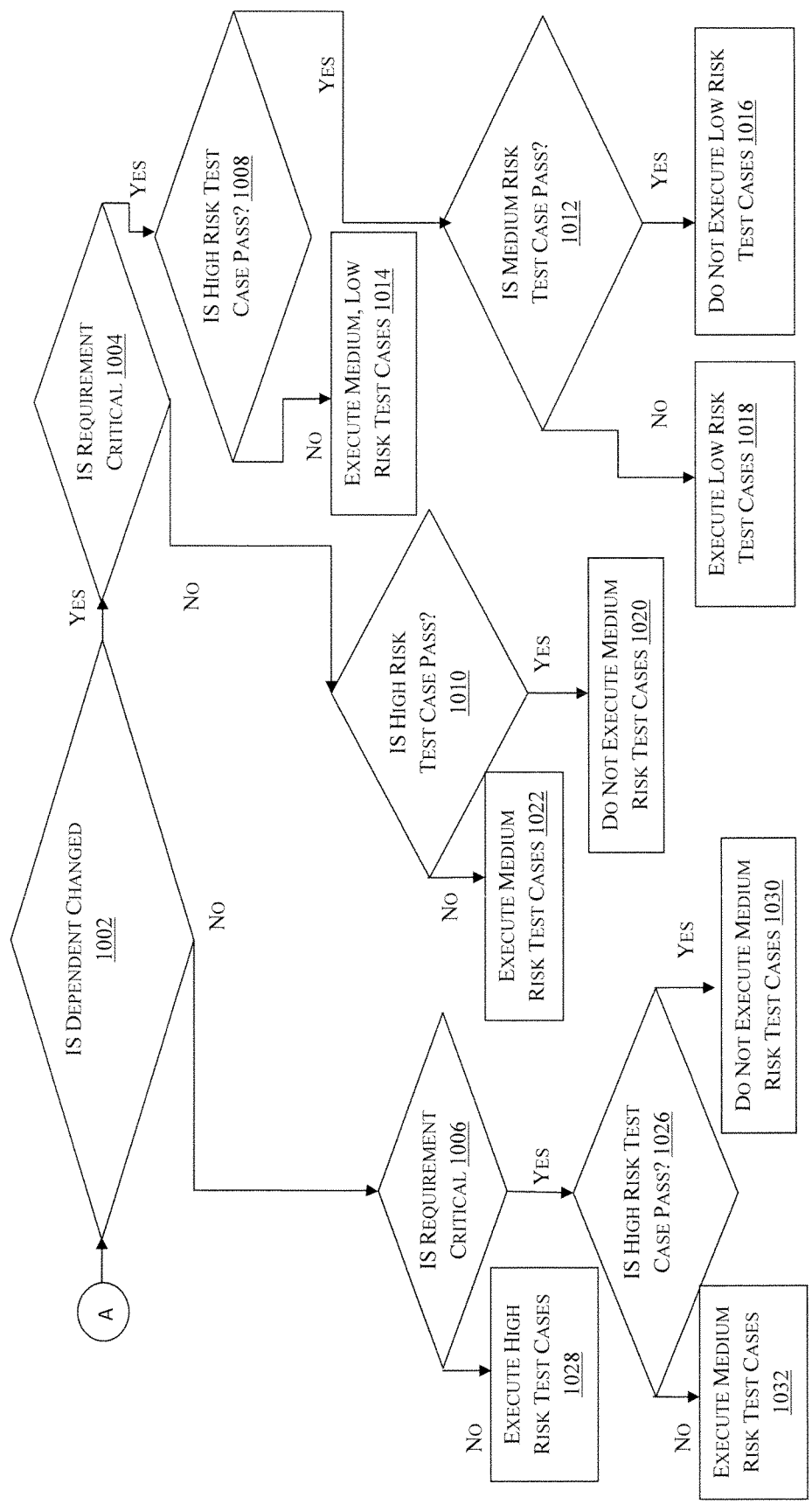

FIGS. 9 & 10 illustrate the method of executing an optimal set of test cases, monitoring the execution results of the optimal set of test cases and updating the non-executed test cases based on the execution results in view of the one or more rules and conditions as illustrated in Table I.

At block 902, a determination is made as to whether the impact requirement is satisfied. In one embodiment, if the determination is TRUE, then the method proceeds to block 904 via "YES", otherwise proceeds to connector A via "NO".

At block 904, a determination is made as to whether the criticality requirement is satisfied. In one embodiment, if the determination is TRUE, then the method proceeds to block 906 via "YES", otherwise proceeds to block 908 via "NO".

At block 906, a determination is made as to whether the execution results of test cases assigned with high risk profile is Pass. In one embodiment, if the determination is TRUE, then the method proceeds to block 910 via "YES", otherwise proceeds to block 912 via "NO".

At block 912, execute medium, low and very low risk test cases. In one embodiment, if it is determined that the execution results of test cases assigned with high risk profile is Fail, then the method proceeds to executing test cases assigned with medium, low and very low risk profile.

At block 910, a determination is made as to whether the execution results of test cases assigned with medium risk profile is Pass. In one embodiment, if the determination is TRUE, then the method proceeds to block 914 via "YES", otherwise proceeds to block 916 via "NO".

At block 916, execute low and very low risk test cases. In one embodiment, if it is determined that the execution results of test cases assigned with medium risk profile is Fail, then the method proceeds to executing test cases assigned with low and very low risk profile.

At block 914, a determination is made as to whether the execution results of test cases assigned with low risk profile is Pass. In one embodiment, if the determination is TRUE, then the method proceeds to block 918 via "YES", otherwise proceeds to block 920 via "NO".

At block 918, the non-executed very low risk profile test cases are updated as, for example, "Do not execute".

At block 920, execute very low risk test cases. In one embodiment, if it is determined that the execution results of test cases assigned with low risk profile is Fail, then the method proceeds to executing test cases assigned with very low risk profile.

At block 908, a determination is made as to whether the execution results of test cases assigned with high risk profile is Pass. In one implementation, if the criticality requirement is not satisfied as determined in block 904, the method proceeds to block 908 to determine as to whether the execution results of test cases assigned with high risk profile is Pass. If the determination is TRUE, then the method proceeds to block 922 via "YES", otherwise proceeds to block 924 via "NO".

At block 924, execute medium and low risk test cases. In one implementation, if it is determined that the execution results of test cases assigned with high risk profile is Fail, then the method proceeds to executing test cases assigned with medium and low risk profile.

At block 922, a determination is made as to whether the execution results of test cases assigned with medium risk profile is Pass. In one implementation, if the determination is TRUE, then the method proceeds to block 926 via "YES", otherwise proceeds to block 928 via "NO".

At block 926, do not execute low risk test cases. In one implementation, if it is determined that the execution results of test cases assigned with medium risk profile is Pass, then the method updates the non-executed test cases assigned with low risk profile as "Do not execute".

At block 928, execute low risk test cases. In one implementation, if it is determined that the execution results of test cases assigned with medium risk profile is Fail, then the method proceeds to executing test cases assigned with low risk profile.

Upon determining that the impact requirement is not satisfied, the method proceeds to block 1002 via connector A.

At block 1002, determination is made as to whether the dependency requirement is satisfied. In one implementation, if the determination is TRUE, then the method proceeds to block 1004 via "YES", otherwise proceeds to block 1006 via "NO".

At block 1004, determination is made as to whether the criticality requirement is satisfied. In one implementation, if the determination is TRUE, then the method proceeds to block 1008 via "YES", otherwise proceeds to block 1010 via "NO".

At block 1008, a determination is made as to whether the execution results of test cases assigned with high risk profile is Pass. In one implementation, if the determination is TRUE, then the method proceeds to block 1012 via "YES", otherwise proceeds to block 1014 via "NO".

At block 1014, execute medium and low risk test cases. In one implementation, if it is determined that the execution results of test cases assigned with high risk profile is Fail, then the method proceeds to execute test cases assigned with medium and low risk profile.

At block 1012, a determination is made as to whether the execution results of test cases assigned with medium risk profile is Pass. In one implementation, if the determination is TRUE, then the method proceeds to block 1016 via "YES", otherwise proceeds to block 1018 via "NO".

At block 1016, do not execute low risk test cases. In one implementation, if it is determined that the execution results of test cases assigned with medium risk profile is Pass, then the method updates the non-executed test cases assigned with low risk profile as "Do not execute".

At block 1018, execute low risk test cases. In one implementation, if it is determined that the execution results of test cases assigned with medium risk profile is Fail, then the method proceeds to executing test cases assigned with low risk profile.

At block 1010, a determination is made as to whether the execution results of test cases assigned with high risk profile is Pass. In one implementation, if the determination is TRUE, then the method proceeds to block 1020 via "YES", otherwise proceeds to block 1022 via "NO".

At block 1020, do not execute medium risk test cases. In one implementation, if it is determined that the execution results of test cases assigned with high risk profile is Pass, then the method updates the non-executed test cases assigned with medium risk profile as "Do not execute".

At block 1022, execute medium risk test cases. In one implementation, if it is determined that the execution results of test cases assigned with high risk profile is Fail, then the method proceeds to executing test cases assigned with medium risk profile.

At block 1006, determination is made as to whether the criticality requirement is satisfied. In one implementation, if the dependency requirement is not satisfied as determined in block 1002, the method proceeds to block 1006 to determine as to whether the criticality requirement is met with. If the determination at block 1006 is TRUE, then the method proceeds to block 1026 via "YES", otherwise proceeds to block 1028 via "NO".

At block 1028, execute high risk test cases. In one implementation, if it is determined that the criticality requirement is not satisfied at block 1006, then the method proceeds to executing test cases assigned with high risk profile.

At block 1026, a determination is made as to whether the execution results of test cases assigned with high risk profile is Pass. In one implementation, if the determination is TRUE, then the method proceeds to block 1030 via "YES", otherwise proceeds to block 1032 via "NO".

At block 1030, do not execute medium risk test cases. In one implementation, if it is determined that the execution results of test cases assigned with high risk profile is Pass, then the method updates the non-executed test cases assigned with medium risk profile as "Do not execute".

At block 1032, execute medium risk test cases. In one implementation, if it is determined that the execution results of test cases assigned with high risk profile is Fail, then the method proceeds to executing test cases assigned with medium risk profile.

Upon determining and updating the execution results of all set of optimal test cases in the TMS 110, the TRU 312 generates a completion signal of testing.

The specification has described a method and a system for optimizing execution of test cases. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing execution of test cases, comprising:
    calculating, by a test case optimization computing device, a failure probability level of a plurality of test cases based on a plurality of test results associated with each of the plurality of test cases;
    determining, by the test case optimization computing device, a risk profile score for the plurality of test cases based on weights assigned to the failure probability level and assigned to a risk impact parameter of the plurality of test cases;
    comparing, by the test case optimization computing device, the risk profile score with one or more risk profile threshold scores, wherein the one or more risk profile threshold scores include a high risk profile threshold score, a medium risk profile threshold score, a low risk threshold score, and a very low risk profile threshold score; and
    determining, by the test case optimization computing device, a dynamic risk profile level of each of the plurality of test cases based on the comparison;
    determining, by the test case optimization computing device, one or more sets of optimal test cases to be executed from the plurality of test cases based on whether the dynamic risk profile level of the plurality of test cases is of lower risk than all previously executed failed test cases and the plurality of test cases satisfies one or more test rule parameters; and
    executing, by the test case optimization computing device, the one or more set of optimal test cases.

2. The method as set forth in claim 1 further comprising:
    identifying, by the test case optimization computing device, a sequence of execution of the one or more sets of optimal test cases based on one or more test sequence parameters; and
    executing, by the test case optimization computing device, the one or more sets of optimal test cases in the identified sequence.

3. The method as set forth in claim 1 further comprising:
    receiving, by the test case optimization computing device, the plurality of test results, the plurality of risk impact parameters associated with the plurality of test cases, and the weights of the failure probability level and the plurality of risk impact parameters of the plurality of test cases from a test management system over a communication network.

4. The method as set forth in claim 1, wherein determining the one or more set of optimal test cases comprises:
    identifying, by the test case optimization computing device, one or more test cases of the plurality of test cases assigned with one or more risk profiles satisfying the one or more test rule parameters; and
    eliminating, by the test optimization computing device, one or more unidentified test cases of the plurality of test cases from executing.

5. The method as set forth in claim 1, wherein the weights associated with the failure probability level and risk impact parameter are configurable by a user.

6. The method as set forth in claim 1, wherein the dynamic risk profile level of each of the plurality of test cases and a corresponding sequence of execution are updated in the test management system by the test optimization system.

7. A test optimization computing device, comprising:
    a memory; and
    a processor coupled to the memory, the processor configured to execute programmed instructions stored in the memory comprising:
    calculating a failure probability level of a plurality of test cases based on a plurality of test results associated with each of the plurality of test cases;
    determining a risk profile score for the plurality of test cases based on weights assigned to the failure probability level and assigned to a risk impact parameter of the plurality of test cases;
    comparing the risk profile score with one or more risk profile threshold scores, wherein the one or more risk profile threshold scores include a high risk profile threshold score, a medium risk profile threshold score, a low risk threshold score, and a very low risk profile threshold score; and
    determining a dynamic risk profile level of each of the plurality of test cases based on the comparison;
    determining one or more sets of optimal test cases to be executed from the plurality of test cases based on whether the dynamic risk profile level of the plurality of test cases is of lower risk than all previously executed failed test cases and the plurality of test cases satisfies one or more test rule parameters; and
    executing the one or more set of optimal test cases.

8. The computing device as set forth in claim 7, wherein the processor is further configured to execute programmed instructions stored in the memory further comprising:
    identifying a sequence of execution of the one or more sets of optimal test cases based on one or more test sequence parameters; and
    executing the one or more sets of optimal test cases in the identified sequence.

9. The computing device as set forth in claim 7, wherein the processor is further configured to execute programmed instructions stored in the memory further comprising:
    receiving the plurality of test results, the plurality of risk impact parameters associated with the plurality of test cases, and the weights of the failure probability level and the plurality of risk impact parameters of the plurality of test cases from a test management system over a communication network.

10. The computing device as set forth in claim 7, wherein the processor is further configured to execute programmed instructions stored in the memory further comprising:
  identifying one or more test cases of the plurality of test cases assigned with one or more risk profiles satisfying the one or more test rule parameters; and
  eliminating one or more unidentified test cases of the plurality of test cases from executing.

11. The computing device as set forth in claim 7, wherein the processor is further configured to execute programmed instructions stored in the memory further comprising:
  transmitting the execution results and the plurality of dynamic risk profile levels assigned to the plurality of test cases to the test management system for updating.

12. A non-transitory computer readable medium having stored thereon instructions for optimizing execution of test cases comprising machine executable code which, when executed by a processor causes the processor to perform steps comprising:
  calculating a failure probability level of a plurality of test cases based on a plurality of test results associated with each of the plurality of test cases;
  determining a risk profile score for the plurality of test cases based on weights assigned to the failure probability level and assigned to a risk impact parameter of the plurality of test cases;
  comparing the risk profile score with one or more risk profile threshold scores, wherein the one or more risk profile threshold scores include a high risk profile threshold score, a medium risk profile threshold score, a low risk threshold score, and a very low risk profile threshold score; and
  determining a dynamic risk profile level of each of the plurality of test cases based on the comparison;
  determining one or more sets of optimal test cases to be executed from the plurality of test cases based on whether the dynamic risk profile level of the plurality of test cases is of lower risk than all previously executed failed test cases and the plurality of test cases satisfies one or more test rule parameters; and
  executing the one or more set of optimal test cases.

13. The medium as set forth in claim 12 wherein the medium further comprises machine executable code which, when executed by a processor causes the processor to perform steps further comprising:
  identifying a sequence of execution of the one or more sets of optimal test cases based on one or more test sequence parameters; and
  executing the one or more sets of optimal test cases in the identified sequence.

14. The medium as set forth in claim 12 wherein the medium further comprises machine executable code which, when executed by a processor causes the processor to perform steps further comprising:
  identifying one or more test cases of the plurality of test cases assigned with one or more risk profiles satisfying the one or more test rule parameters; and
  eliminating one or more unidentified test cases of the plurality of test cases from executing.

\* \* \* \* \*